(12) United States Patent
Harper et al.

(10) Patent No.: US 7,148,923 B2
(45) Date of Patent: Dec. 12, 2006

(54) METHODS AND APPARATUS FOR AUTOMATIC EXPOSURE CONTROL

(75) Inventors: Jeffrey D. Harper, Charlotte, NC (US); Robert M. Hussey, Camillus, NY (US); Matthew W. Pankow, Camillus, NY (US); Timothy P. Meier, Camillus, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 100 days.

(21) Appl. No.: 09/903,300

(22) Filed: Jul. 11, 2001

(65) Prior Publication Data

US 2002/0039137 A1    Apr. 4, 2002

Related U.S. Application Data

(60) Provisional application No. 60/237,063, filed on Sep. 30, 2000.

(51) Int. Cl.
| | |
|---|---|
| H04N 5/235 | (2006.01) |
| H04N 5/225 | (2006.01) |
| H04N 1/024 | (2006.01) |
| G06K 7/10 | (2006.01) |
| G06K 9/00 | (2006.01) |

(52) U.S. Cl. ............... 348/229.1; 348/362; 348/221.1; 348/376; 235/462.01; 382/168; 358/473

(58) Field of Classification Search ............ 348/221.1, 348/229.1, 362; 235/462
See application file for complete search history.

(56) References Cited

U.S. PATENT DOCUMENTS

| | | | | |
|---|---|---|---|---|
| 4,324,474 A | * | 4/1982 | Kraemer et al. ............... 355/68 |
| 5,227,614 A | * | 7/1993 | Danielson et al. ..... 235/472.01 |
| 5,258,848 A | * | 11/1993 | Kondo et al. ............ 348/229.1 |
| 5,548,108 A | * | 8/1996 | Moldskred et al. .... 235/462.25 |
| 5,702,059 A | * | 12/1997 | Chu et al. .............. 235/462.25 |
| 5,815,200 A | * | 9/1998 | Ju et al. .................. 348/229.1 |
| 5,834,753 A | | 11/1998 | Danielson et al. |
| 5,892,971 A | * | 4/1999 | Danielson et al. ............. 710/7 |
| 6,019,286 A | | 2/2000 | Li et al. |
| 6,062,475 A | * | 5/2000 | Feng ..................... 235/462.06 |
| 6,836,288 B1 | * | 12/2004 | Lewis ..................... 348/229.1 |

* cited by examiner

*Primary Examiner*—David Ometz
*Assistant Examiner*—Nhan Tran

(57) ABSTRACT

A multi-dimensional imaging device and method for automated exposure control that implement two distinct modules to control the exposure and gain settings in the imager so that processing can occur in a multi-tasking single CPU environment. The first module, referred to herein as the imager control module, controls the exposure and gain settings in the imager. The first module is typically implemented in a high priority routine, such as an interrupt service routine, to insure that module is executed on every captured frame. The second module, referred to herein as the histogram processing module, calculates a target contrast (the product of the targeted exposure and gain settings) based on feedback data from the first module and image data from memory. The second module is typically implemented in a low priority routine, such as a task level routine, to allow for the routine to be executed systematically in accordance with priority.

33 Claims, 6 Drawing Sheets

METHODS AND APPARATUS FOR AUTOMATIC EXPOSURE CONTROL

CROSS-REFERENCE TO RELATED APPLICATIONS

The present application claims priority from U.S. Provisional Patent Application Ser. No. 60/237,063, filed Sep. 30, 2000, the contents of which are herein incorporated by reference.

FIELD OF THE INVENTION

The present invention relates to exposure control in a portable optical imaging device and more particularly to a method and apparatus for automatic, real-time, exposure control for an optical imager in a multi-dimensional optical imaging apparatus.

BACKGROUND OF THE INVENTION

Portable optical imaging devices such as bar code readers, optical character readers, digital cameras and the like have come into widespread use in large numbers of retail, industrial and medical applications. Such imaging devices are used to perform routine data entry functions such as pricing, inventory control, etc., with an accuracy and reliability that far exceeds that of manual data entry. These and other advantages, such as high data throughput rates and direct compatibility with data processing devices and systems, assures that imaging devices will become more prevalent in the future. As the use of such devices increases the demands on the devices will increase as well. These demands will dictate that the portable imaging devices of the future read, record and decode ever-increasing quantities and densities of optically encoded data.

Portable imaging devices, such as bar code readers are known for reading one-dimensional (1D) and two-dimensional (2D) bar code symbols, such as bar coded information in supermarkets, etc. A variety of different bar code symbols are widely known and are currently being used in various applications. In those applications where the amount of data is relatively small, the data is conveniently encoded in a one-dimensional bar code symbol. For example, 1D bar code symbologies, such as Code 49, Code 39, Code 128, and Codebar have been developed to allow encoding of relatively small amounts of data. See for example, U.S. Pat. No. 4,794,239, entitled "Multitrack Bar Code and Associated Decode Method", issued on Dec. 27, 1988, in the name of inventor Allais, in which Code 49 symbology is described. The 1D symbologies use stacked symbols that partition the encoded data into multiple rows, each including a respective 1D bar code pattern. In operation, all or most of the symbols must be scanned, decoded and then linked together to form a complete message.

In accommodating the need for reading, recording and decoding increasing quantities and densities of data, 2D matrix symbologies have been developed which offer orientation-free scanning and greater data densities and capacities that the ID counterparts. 2D matrix codes encode dark or light data elements within a regular polygonal matrix, accompanied by graphical finder, orientation and reference structures. For example, 2D symbologies, such as PDF 417, MaxiCode and DataMatrix have been developed to allow for encoding of large volumes of data. See for example, U.S. Pat. No. 5,304,786, entitled "High Density Two Dimensional Bar Code Symbol", issued on Apr. 19, 1994, issued in the name of inventors Pavlidis, et al, in which PDF 417 symbology is described. PDF 417 uses a "two-dimensional" scheme in which rows of characters are stacked vertically. That is, there are several rows of bar and space patterns, instead of only one row.

2D solid state image sensors, such as charge couple device (CCD) image sensors, are capable of receiving optically encoded data images and converting them to electrical signals. When these image sensors are incorporated with optical imaging systems that provide properly exposed and focused images of their target and with signal processors that include suitable decoding software, these image sensors are able to read data from various types, shapes and sizes of barcodes and other symbols.

As stated, the ability to read data from a wide range of products diverse in material, size, shape and the like is directly related to providing proper imager exposure to the object being pattern recognized or scanned. Paramount to this concern is the ability to adjust the exposure setting in a real time fashion so that exposure settings are accurate for the image being captured.

In the instance in which the imaging device requires software or an algorithm to decode the image, such as a bar code reader or the like, it is imperative that the imaging device provide properly exposed images to the algorithms. The decode algorithms in such devices are typically limited by the built-in exposure control of the imager (i.e. camera). This limitation will generally slow down the decoding process and add inefficiency to the overall image capture and decode process. Therefore, it becomes imperative to implement an automated exposure control mechanism distinct from the imager, so that the efficiency of the decoding process is not adversely effected.

In most current portable imaging devices that incorporate multiple processors the implementation of automated imager control modules is relatively simplistic because an individual processor can be dedicated to executing the automated exposure control routine while other processors are dedicated to executing operating systems, application programs and the like. However, implementing an exposure control mechanism that will provide accurate real-time exposure settings (i.e. automatic exposure control) under a multi-task operating system environment can be problematic. In a typical multi-tasking environment, a single central processing unit (CPU) may be incorporated that is capable of implementing the application programs, as well as, the image capture and decoding processes. In such a shared processor environment it is necessary to minimize the allocated use of the CPU for any one application. For example, in the image capture and decode process the exposure must be written to the imager during specific intervals of time in the imager's frame period. This requires a real-time response to keep up with the imager's state and to respond to any frame signals from the imager.

Conversely, in a multi-tasking operating system where there are tasks that share the central processing unit (CPU), the routines that the CPU conducts should not preoccupy the CPU continuously with automatic exposure computations. In this regard, what is desired is a dual purpose module that will allow intensive CPU computations to exist at the task level where it can be preempted by other tasks that require CPU time. Additionally, the module will allow for control of the imager in real-time response to exist in an interrupt service routine where it can meet the timing criteria of the imager.

To address this concern, the inventive concepts herein disclosed implement the code/routines in two distinct modules. The module that controls the camera is implemented in an interrupt service routine. Other implementations could implement this module in a high priority or real-time thread or task. The module that does the computations on the image to determine what exposure and gain settings should be used is implemented in lower priority thread or task. This permits the module that does the intensive CPU computations to exist at the task level while the module that controls the imager and requires real-time response exists in an interrupt service routine where it can meet stringent timing criteria.

SUMMARY OF THE INVENTION

An automatic exposure control process for multi-dimensional imaging devices capable of operating in a multitasking environment is therefore provided that implements two distinct modules. The imager control module controls the imager by updating the imager with adjusted exposure and gain settings. The histogram processing module does the computations on the image to determine what exposure and gain settings should be targeted. The imager control module receives end of frame signals from an imager and the histogram processing module calculates a target contrast from gain and exposure data communicated from the imager (i.e. feedback), and image data in memory. The histogram processing module then communicates the target contrast to the imager control module. The imager control module uses the received target contrast to derive exposure and gain settings that are written to the imager.

In one embodiment of the invention, the automated exposure control process is embodied within an imaging device for capturing optical image data from an image. The device includes an imager for generating an image signal, a memory component that receives the image signal from the imager and stores the image signal as image data and a processor that executes exposure control processing. The exposure control is implemented by a first module that controls the exposure and gain setting in the imager and a second module that implements computations in response to image data transmitted from the memory component and exposure data transmitted from the first module to determine a targeted exposure and gain setting.

In one embodiment of the invention the imaging device described above is capable of reading multi-dimensional image symbologies. The processor embodied within the imaging device of the present invention will typically provide multi-tasking capabilities, in that, one or more application programs and/or an operating systems may be executed on the processor while the exposure control process is on-going. To accommodate such multi-tasking capability, the first module is typically implemented as a high priority routine, such as an interrupt service routine that allows for exposure and gain settings to be determined for every frame that is captured. The second module is typically implemented as a low priority routine, such as a task level routine that allows the typical histogram processing computations that occur in the second module to be preempted as needed based on priority hierarchy.

In an alternate embodiment, the imaging device may include a Direct Memory Access (DMA) controller that receives the image signals from the imager, responds to an image capture command from the second module and transfers captured image signals into the memory component. The DMA controller may be implemented on the processor or it may be implemented in another device, such as a programmable logic device. In embodiments implementing a programmable logic device, the logic device typically serves as an interface between the imager, the processor and the memory component.

The present invention is also defined by a method for exposure control in a multi-dimensional imaging device. The method comprises generating, at an imager, an end of frame signal and executing, at a central processor, a first module that controls exposure and gain settings in the imager in response to the end of frame signal. The first module then generates a captured contrast setting and the second module executes, at the central processor, by calculating a target contrast setting in response to the end of frame image signal, the captured contrast setting and stored image data. A subsequent (or new) exposure and gain setting is then generated in the first module in response to the target contrast setting. The subsequent exposure and gain settings are then implemented in the imager. The first module is typically implemented in a high priority routine, such as an interrupt service routine and the second module is typically implemented on a low priority routine such as a task level routine. In alternate embodiments, the processor that executes the first and second modules is additionally responsible for executing at least one imaging device appplication program and/or an image device operating system.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
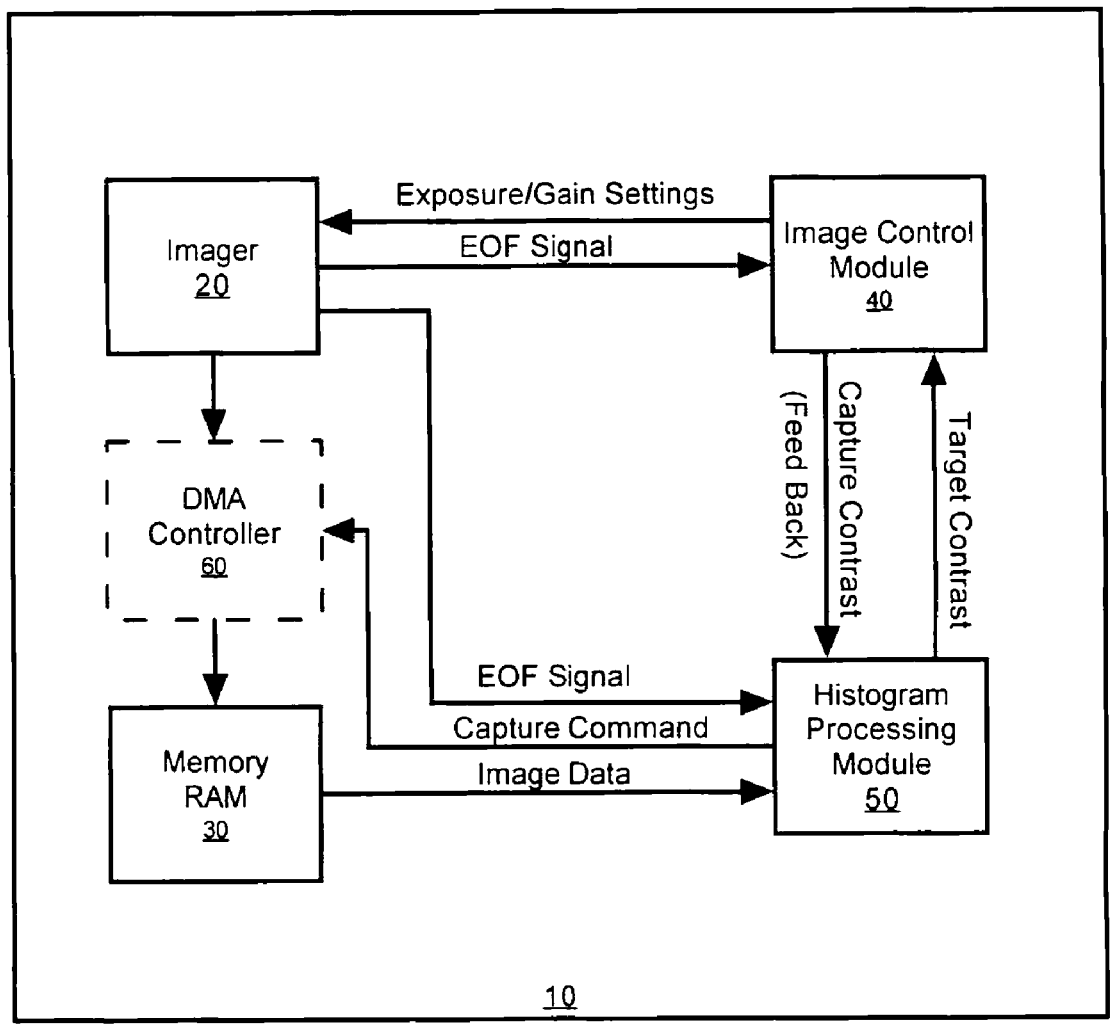
FIG. 1 is a block diagram of the automatic exposure control process implemented in a multi-dimensional imaging device in accordance with one embodiment of the present invention.

FIG. 1 is a block diagram that depicts the interaction between components in an imaging device incorporating automatic exposure control, in accordance with the present invention. The imaging device 10 comprises an imager 20, typically a camera that provides continuous image data to imaging device memory component 30, such as Random Access Memory (RAM). The imager will typically be capable of reading at least two-dimensional image symbologies, such as PDF 417, MaxiCode, DataMatrix and the like.

The imager 20 communicates with an imager control module 40 and a histogram processing module 50 to perform automated exposure control for the imager. The imager control module controls the imager's gain and exposure settings through the use of a target contrast parameter supplied by the histogram processing module. In addition, the imager control module processes a frame signal to determine how a recently retrieved image has been exposed and communicates this information back to the histogram processing module for further calculation of the target contrast. Similarly, the histogram processing module calculates a target contrast based on the End of Frame (EOF) signal communicated from the imager 20.

The imager control module 40 is typically implemented in an interrupt service routine. Other embodiments of the invention could implement this module in a high priority or real-time thread or task. The histogram processing module that does the computations on the image to determine what exposure and gain settings should be used is implemented in a task routine or other low priority routines. By incorporating two unique modules it permits the module that does the intensive CPU computations (i.e. the histogram processing module) to exist at the task level while the module that controls the imager and desires real-time response (i.e. the imager control module) to exist in an interrupt service routine where it can meet stringent timing criteria. Thus, the overall exposure control process minimizes the use of processor capabilities so that other applications an/or modules may be implemented by the processor. In this fashion, the dual-module process is capable of providing automated exposure control to an imaging device that operates in a multi-tasking environment.

Typically, the imaging device will embody a Direct Memory Access (DMA) controller 60 that is responsible for controlling the transfer of image data from the imager to the memory. In one embodiment of the invention the DMA controller resides in a processor device (not shown in FIG. 1). It should be noted that the DMA controller is not essential to the functioning of the automated exposure control process and in certain embodiments of the invention in which the image data is directly transferred into memory and the capture command is sent from the histogram process device directly to the imager it may be possible to eliminate the need to incorporate a DMA controller.

Figure 2:
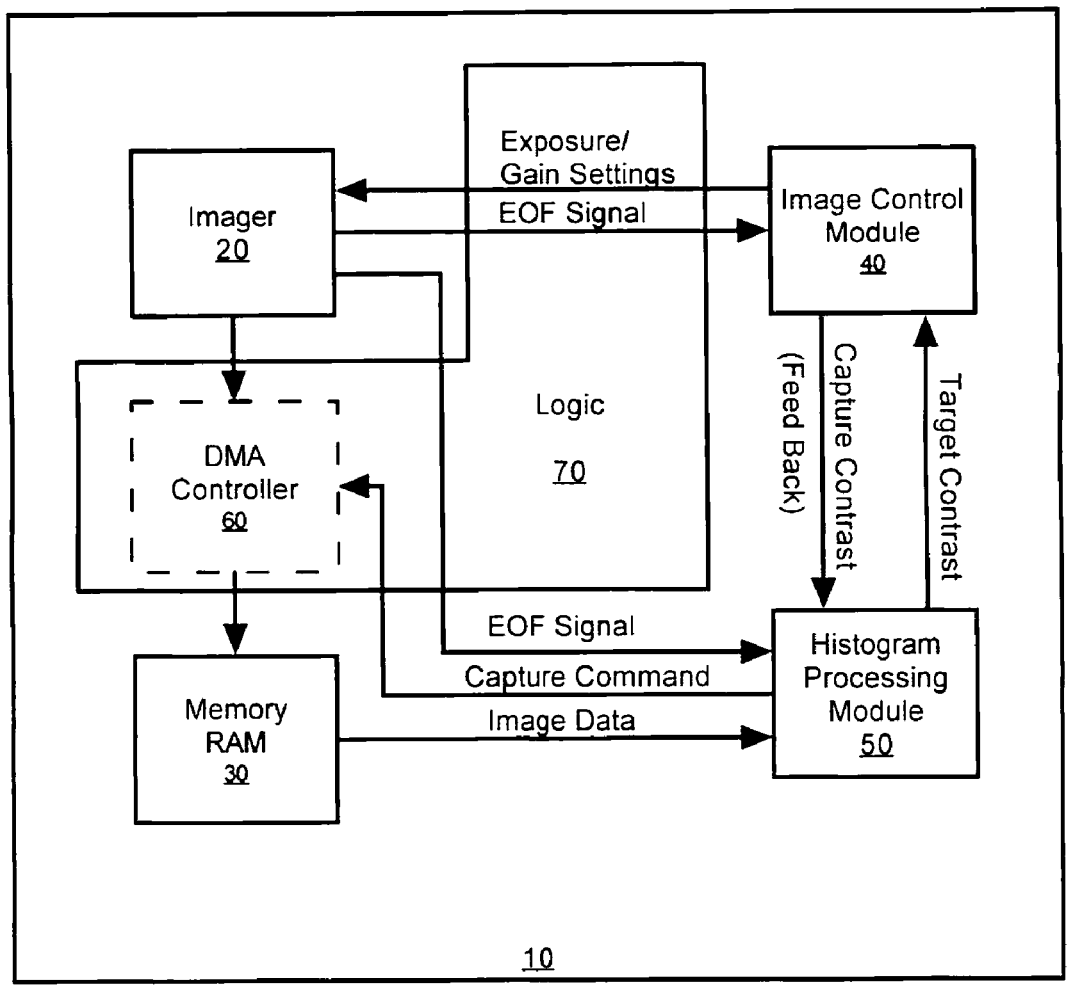
FIG. 2 is a block diagram of an alternate embodiment of the automatic exposure control process in a multi-dimensional imaging device in accordance with the present invention.

FIG. 2 is an alternate embodiment of the present invention in which a logic device 70, preferably a Field Programmable Logic Device, is implemented as an interface between the imager 20 and the imager control module 40. In this embodiment the imager generates an EOF signal that is sent to the logic device. The logic device sends the EOF signal to the imager control module and the histogram control module. The imager control module then transmits exposure and gain settings to the imager via the logic device.

In embodiments that incorporate a DMA controller 60 as the interface between the imager 20 and the memory component 30, the DMA controller may be implemented in the logic device interface 70 or it may reside in any other suitable device capable of implementing DMA controller activities. In the embodiment in which the DMA controller is implemented in the logic device interface (FIG. 2), the histogram processing module will send capture commands to the DMA controller via the logic device, the DMA controller will provide an image to the memory and the histogram processing module will read the image from the memory.

In order to appreciate the processing that is undertaken in the imager control module and the histogram control module it is necessary to define the requisite exposure control parameters. Exposure is defined as the amount of time that the imager exposes the imager cells to light. The gain is defined as the conversion between the number of photons recorded by the imager and the number of digital units ("counts") included in the image. Gain is typically applied prior to the signal being digitized. The gain and exposure settings both produce a linear scaling of the data in the image. By way of example, if you double the exposure or gain, the pixel values obtained from the imager would be twice as large. Contrast is defined in this application as the product of exposure and gain (exposure×gain=contrast). In order to obtain an image that is properly exposed either the gain or the exposure can be adjusted as long as the product of the gain and the exposure is equal to the desired, or targeted, contrast.

The histogram processing module makes requests to the imager control module for an image with a particular contrast (i.e. target contrast). Based on this request the imager control module attempts to set the gain and exposure values so that the product of the two values are equal to the target contrast. As is known by those of ordinary skill in the art, changes to the exposure settings in the imager do not typically take effect immediately. While one image is being transferred by the DMA controller to the RAM, the next image is being exposed. In this manner, assigning the letter n to one of the images that is captured and writing an exposure setting just prior to starting the capture process for image n, that exposure setting will not go into effect until image n+1 is being captured. Therefore, the imager control module is responsible for keeping up with the current exposure setting and knowing which frame of data coming from the imager will have a particular exposure setting. Conversely, changes to the gain setting take effect immediately if the gain setting is changed before an image is captured.

Since exposure settings do not take place immediately, the histogram processing module needs data on the contrast of each image being captured as to what contrast was actually captured. The histogram processing module uses the feedback, including the contrast of the capture image, to calculate a target contrast for future image data. The imager control module interfaces with the histogram processing module to supply the feedback information, related to the most recently captured image, to the histogram processing module. In order to track the exposure and gain setting, of each frame captured the imager control module will typically be implemented in either a high priority task or an interrupt service routine. These implementations are capable of insuring that EOF signals from the imager are not inadvertently lost and that contrast for each frame is determined accurately.

Imager Control Module

The imager control module only executes in response to an EOF interrupt signal communicated from the imager. In one embodiment of the invention, the imager control module communicates with the histogram processing module through a shared data structures in which a group of related variables exist that both the imager control module and the histogram processing module have access to. Other means of communication between the imager control module and the histogram processing module is also possible and within the inventive concepts herein disclosed. The imager control module comprises an EOF processing routine. This routine keeps a counter with a frame number that is incremented each time an EOF frame signal is received by the imager control module. The imager control module accesses the shared memory area to read the target contrast that has been requested from the histogram processing module.

Figure 3A:
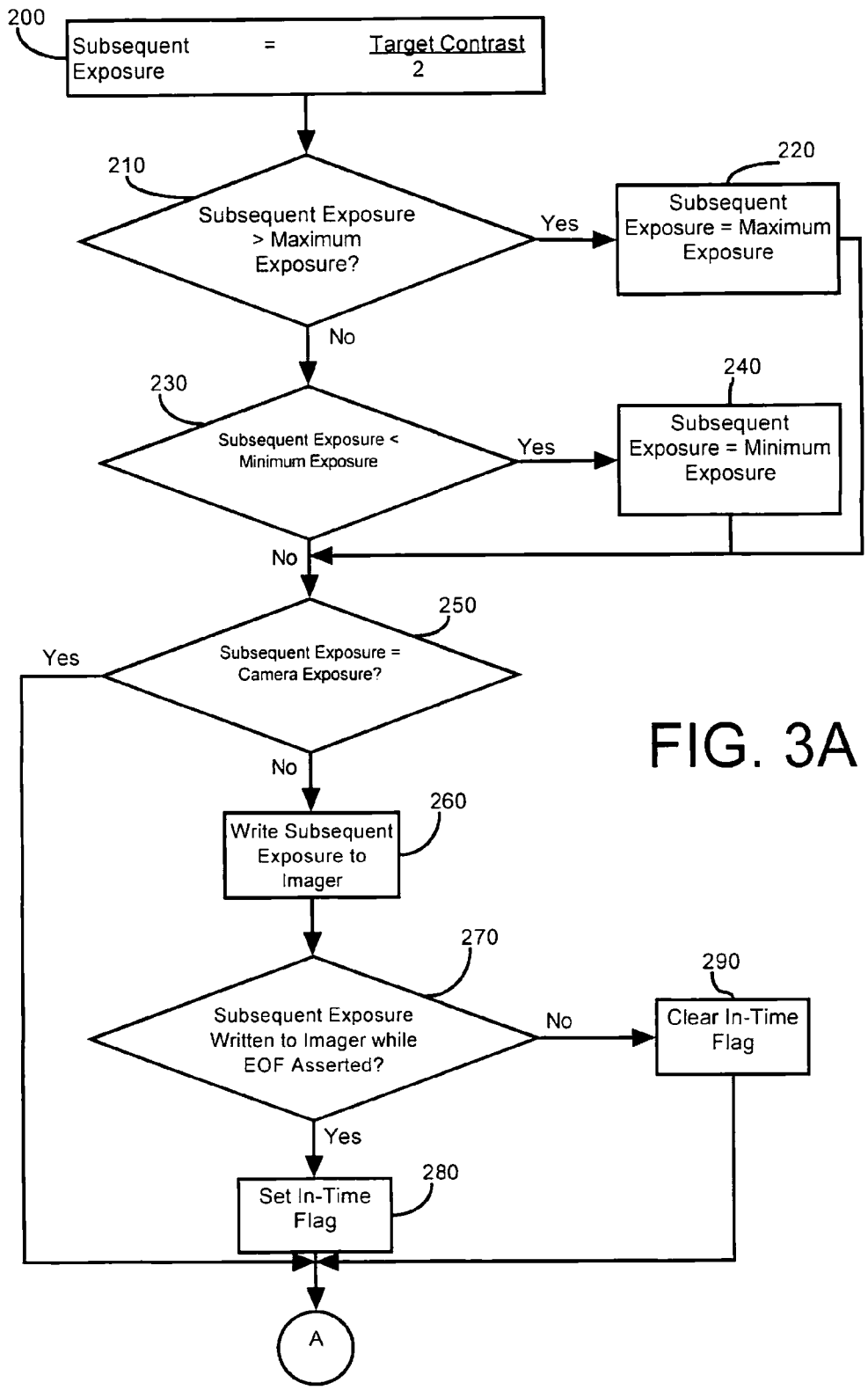
FIGS. 3A–3C are flow chart illustrations of the processing that occurs within the first module (the imager exposure module) of the automated exposure control process, in accordance with an embodiment of the present invention.
Figure 3B:
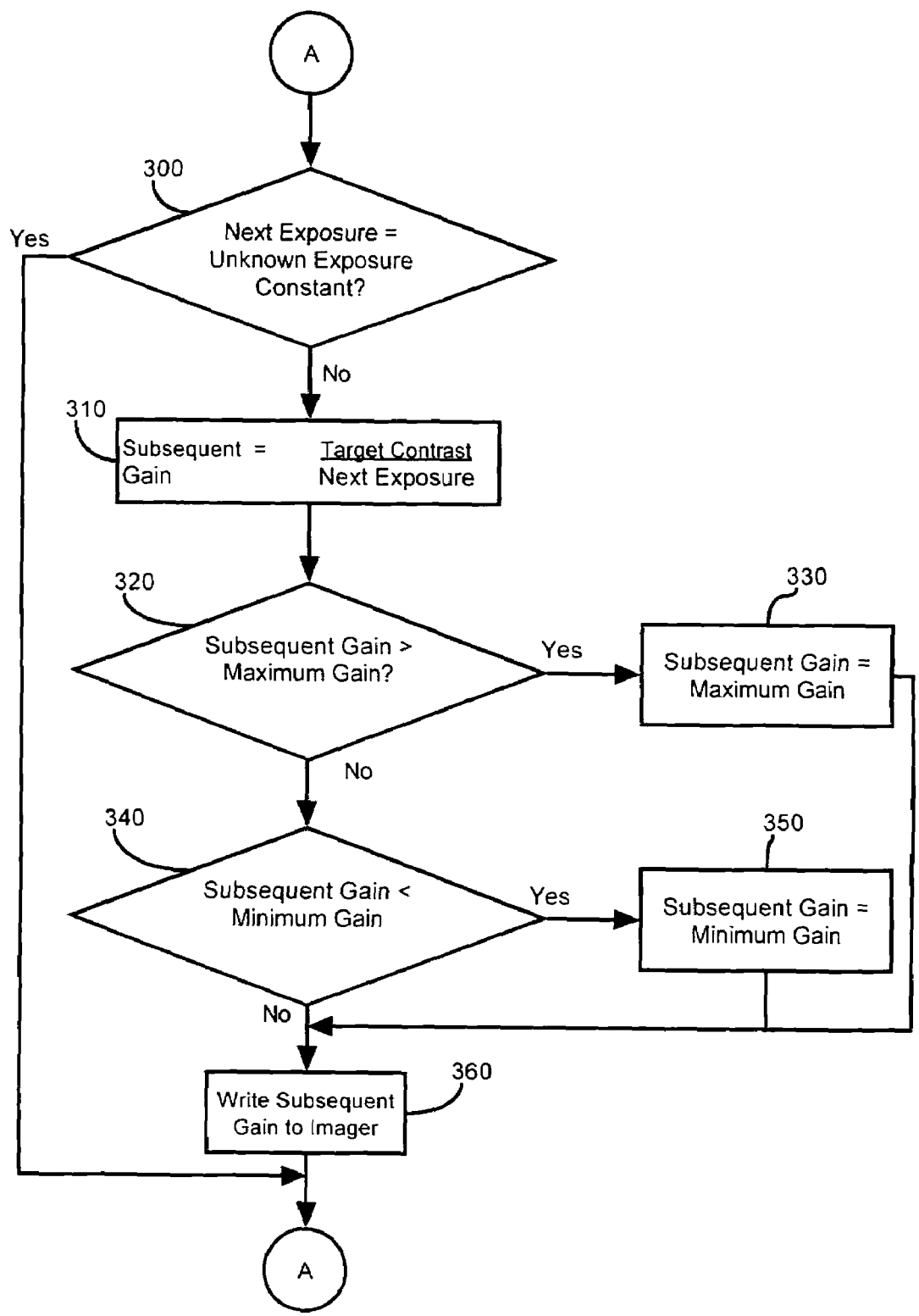
Figure 3C:
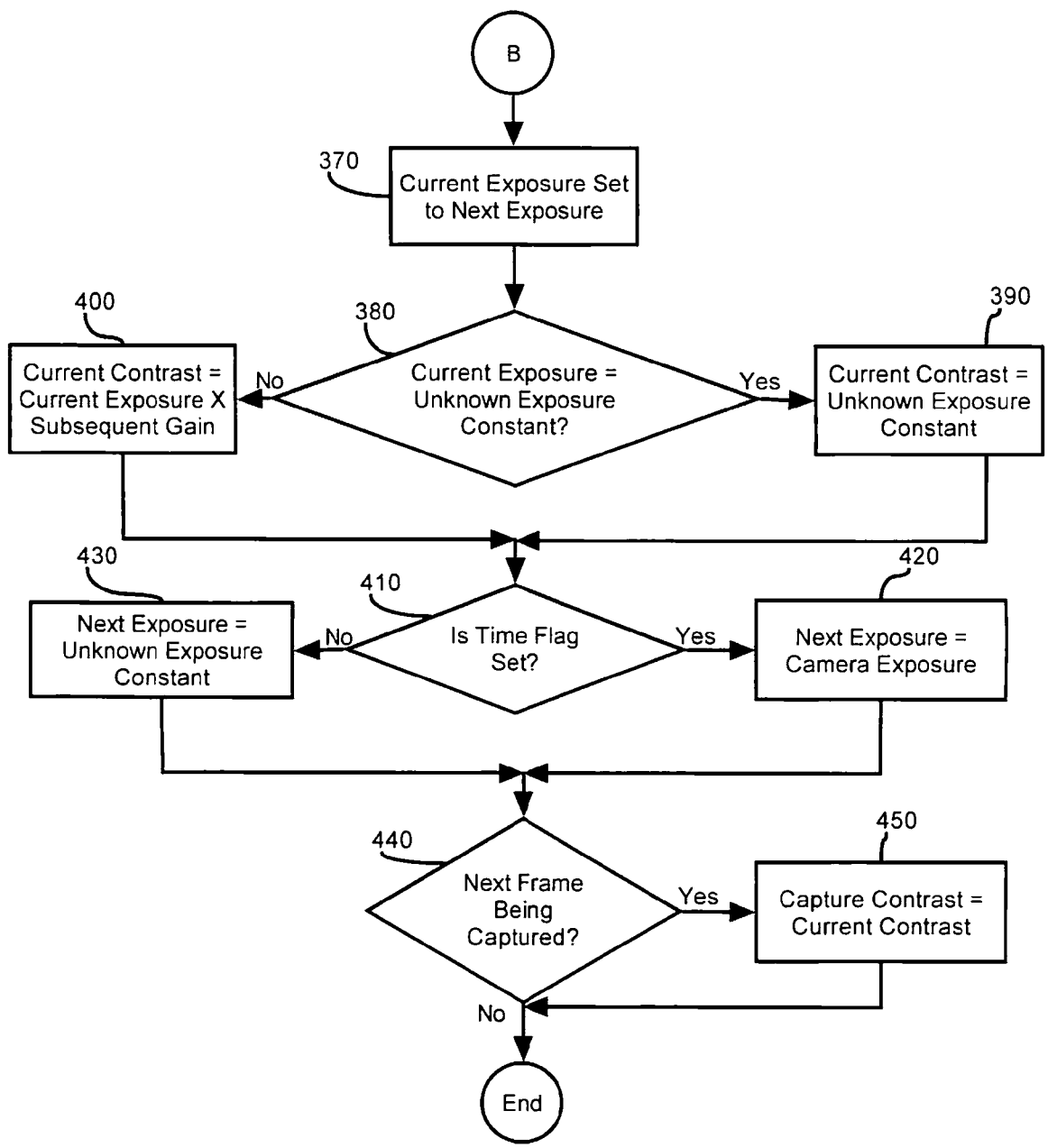

FIGS. 3A–3C, depict a flow diagram of the processing within the imager control module in accordance with the present invention. At 200, the target contrast, received from the histogram processing module is implemented to compute a subsequent (i.e. new) exposure setting. In accordance with an embodiment of the present invention, the subsequent exposure setting will be equal to the target contrast divided by two (target contrast/2). The subsequent exposure is defined as such in relation to the median value for gain. In one embodiment of the invention, the imager will support gains between one and seven; however, if the gain is set too high it will add noise to the image. With the noise factor in mind, gain in this instance is limited to between one and four with the midpoint value of two.

In application, setting the subsequent exposure doesn't take effect immediately but setting the gain does take effect immediately. Thus, before the exposure takes effect, a new frame will be captured. When the new frame is processed the histogram processing module may decide to alter the target contrast. Therefore, by dividing the target contrast by two, in those instances in which the target contrast does not change the gain setting for the n+1 image will be equal to 2. However, if the target contrast does shift slightly, since the gain setting is halfway between 1 and 4, the gain can be changed in either direction to a closer matching target contrast. The imager control module writes an exposure based on the target contrast. The module writes the exposure prior to frame n, but the exposure will not go into effect until frame n+1. The histogram processing module may set a new target contrast between frame n and frame n+1. If this occurs, the only way the imager control module will be able to reach the new target contrast for frame n+1 is by altering the gain. It is likely that the target contrast that is set between frame n and n+1 will be close to the target contrast set before frame n.

Hence, the imager control module sets the new exposure such that if the target contrast doesn't change between frame n and n+1, the gain set for frame n+1 will be two. If a new target contrast is set, the gain can be adjusted upward or downward from two. If the target contrast set between frame n and n+1 decreases, but it does not go below half of the target contrast set before frame n, it will be possible to adjust the gain downward so that when frame n+1 is captured it will have the new target contrast. Likewise, if the target contrast set between n and n+1 increases, but it does not go above twice the target contrast set before frame n, it will be possible to adjust the gain upward so that when frame n+1 is captured it will have the new target contrast.

Once a subsequent exposure setting is determined from the target contrast the range of the subsequent exposure is verified to assure that the subsequent exposure setting lies below the valid maximum exposure setting and above the minimum exposure setting. At 210, the subsequent exposure is compared to the maximum exposure. If the subsequent exposure exceeds the maximum value then, at 220, the subsequent exposure setting is set to the maximum exposure setting. A maximum exposure setting is set to eliminate blurring due to motion. The longer the exposure time the more likely that movement of the image will cause blurring and therefore the imager control module forces the exposure setting to be below the maximum setting. If the subsequent exposure setting is below the maximum value then, at 230, the subsequent exposure setting is compared to the minimum exposure setting. If the subsequent exposure is below the minimum exposure setting, then at 240, the subsequent exposure setting is set to the minimum exposure setting, typically, zero by default.

At 250, it is determined if the subsequent exposure is equal to the current imager exposure. If it is equal then it is not necessary to write the subsequent exposure to the imager. It is not equal then, at 260, the subsequent exposure setting is written to the imager.

In writing the exposure and gain settings a small window of time exists between the end of one frame and the beginning of the next frame during which the settings can be written in order to assure that they take effect in the desired time. In order to make sure that the exposure and gain settings are written within the desired interval of time, the EOF signal is synthesized coming from the imager. The synthesized EOF signal is a pulse and the pulse is either asserted or a true state exists during the period of time that it is valid to write the exposure and gain settings. In this manner, the leading edge of the pulse causes the imager control module to execute and respond to the EOF and after the exposure and gain settings are written to the imager that signal is checked to verify that it is still true. If a determination is made that the signal is true then the imager control module managed to write the exposure and gain settings within the required time period. If a determination is made that the signal is not true the imager control module has to account for the possibility that it missed its window of opportunity to write the exposure and gain settings. In the instance, the imager control module will write data in the shared data structure that indicates that the exposure is unknown. The histogram processing module needs to know what the capture contrast was in order to compute the target contrast. Therefore, when the exposure is unknown to the histogram processing module it will ignore the frame when trying to calculate the new target contrast.

Once the subsequent exposure is written to the imager a determination is made, at 270, to insure that the subsequent exposure setting was written to the camera while the EOF signal was still being asserted. If the subsequent exposure was written within the assertion period then, at 280, the inTime flag is set. If the subsequent exposure was not written within the assertion period then, at 290, the inTime flag is cleared.

At 300, a determination is made to assess whether next exposure is set to the unknown exposure constant. The unknown exposure constant signifies that the exposure may have been written late and, therefore, the constant needs to be assigned to the next exposure to indicate the exposure is unknown. If the next exposure is set the unknown exposure constant then it is not necessary to compute a subsequent gain setting. If the next exposure has not been set to the unknown exposure constant, a subsequent gain setting is computed, at 310, as the target contrast (from the histogram processing module) divided by the exposure for the upcoming image being captured (i.e. next exposure setting). The subsequent (i.e. new) gain setting will take effect on the next image that is being captured. Since the exposure has already been set for the next image, the new gain setting has to be computed based on the next exposure. After the gain setting is derived it is range checked to assure that it is within the set maximum and minimum gain settings. As previously stated the gain set range will be within 1 to 4. At 320, the subsequent gain is compared to the maximum gain. If the subsequent gain exceeds the maximum value then, at 330, the subsequent gain setting is set to the maximum gain setting. If the gain is too high, noise in the analog image signal will be amplified too much producing an image that the pattern recognition and decode modules may not be able to process. If the subsequent gain setting is below the maximum value then, at 340, the subsequent gain setting is compared to the minimum gain setting. If the subsequent gain is below the minimum gain setting, then at 350, the subsequent gain setting is set to the minimum gain setting. A minimum gain setting is set to a value of one. At 360, once the gain setting is within the required range it is then written to the imager.

Once the gain and exposure have been written to the image then, at 370, the current exposure is set to the next exposure (i.e. the exposure that was set the last time the module was executed). A determination is then made, at 380, to assess whether the current exposure is set to the unknown exposure constant. If the current exposure is set to the unknown exposure constant then, at 390, the current contrast is set to the unknown exposure constant. If the current exposure is not set to the unknown exposure constant then, at 400, the current contrast is set to product of the current exposure and the subsequent gain.

Once the current contrast has been set then, at 410, a determination is made to insure that the inTime flag is set. If the inTime flag is set then, at 420, the next exposure is set to the camera exposure (i.e. the exposure value set in the imager). If the inTime flag is not set then, at 430, the next exposure is set to the unknown exposure constant.

The module then, at 440, makes a determination if the next frame is to be a captured frame, and, if so, at 450, the captured contrast is set to the current contrast.

Histogram Processing Module

The histogram processing module serves to adjust the imager settings and the contrast such that the white value of an image that is captured will be within the optimal range for pattern recognition and barcode decoding. In order to do this, the histogram processing module generates a histogram for an image and it uses the contrast of the image and the histogram to determine a new contrast (i.e. the target contrast) for the next image so that the next image will have a white value that will approach or be within the range of the target optimal white value.

Figure 4:
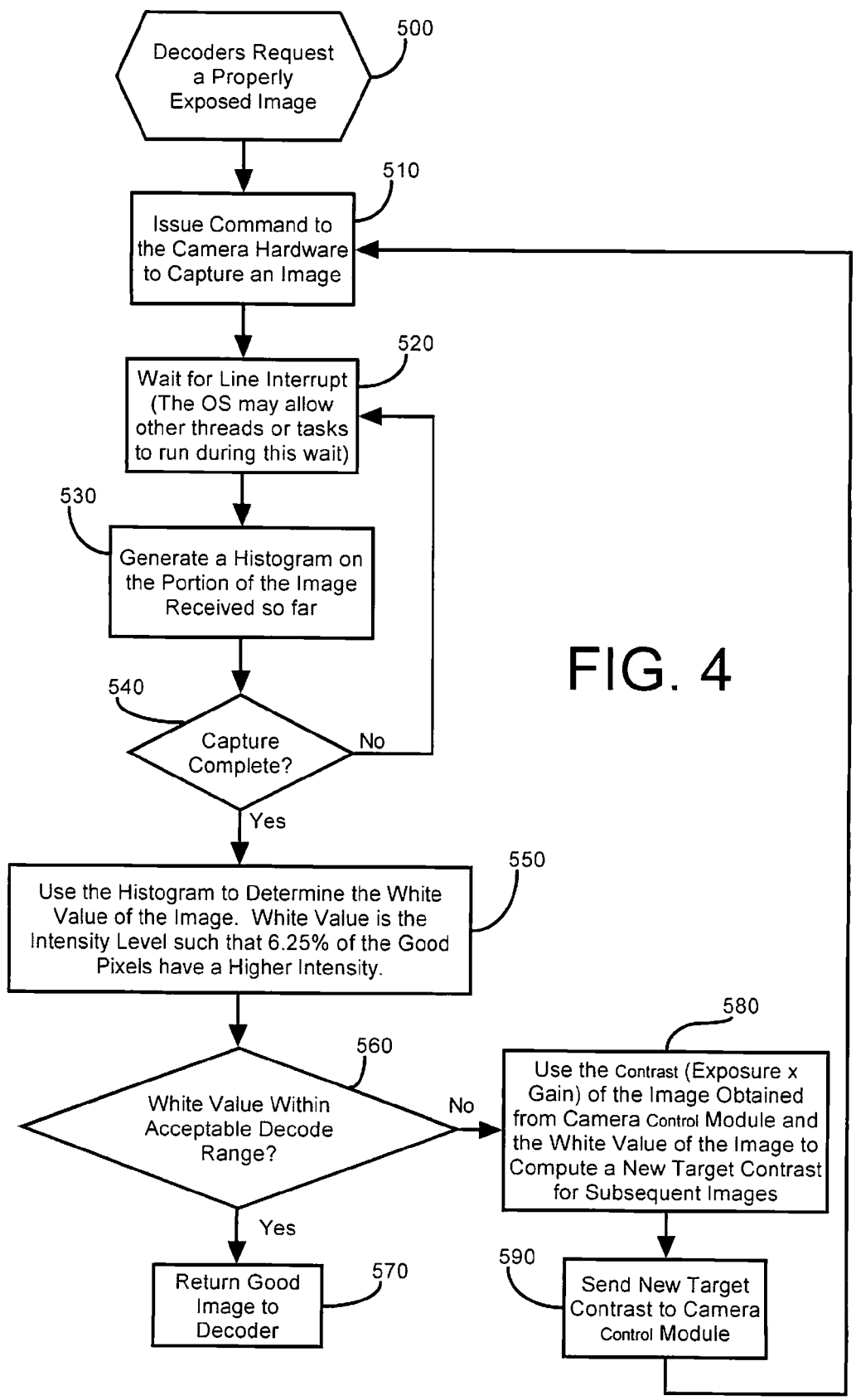
FIG. 4 is a flow chart illustration of the processing that occurs within the second module (the histogram processing module) of the automated exposure control process, in accordance with an embodiment of the present invention.

FIG. 4 depicts a flow diagram of the processing within the histogram processing module in accordance with the present invention. At 500, the image decoder requests a properly exposed image and, at 510, this prompts a capture command to be issued from the histogram processing module to the imager hardware.

The histogram processing module receives a line interrupt when the image decoder receives every n lines of data. In one embodiment of the invention the n value is set to 24 although any other value for n can be set. At 520, the histogram processing flow waits for the line interrupt to occur and during this period the operating system of the imager may allow for other threads or tasks to be run during the wait period. At 530, the histogram processing module generates a histogram the image as it is being captured. In the n=24 embodiment, once every 24th image line the histogram processing module receives an interrupt and it adds the new data to a running histogram of the data.

A determination is made, at 540, as to whether the image has been capture completely. If the image has not been captured completely then the histogram processing returns to 520 and waits for the line interrupt to occur so that further updating of the histogram can occur. If the image has been captured completely and the histogram has been updated then, at 550 histogram processing module then determines the white value of that image. The histogram is searched to find white value such that 6.25% of the pixels have a higher intensity than the white value. The 6.25% value determines the white value for that particular image. At 560, a determination is made as to whether the white value of the image is within an acceptable decode range. If the white value is within the acceptable decode range then, at 570, the image is returned to the decoder.

If the white value fall outside of the acceptable decode range then, at 580, the histogram processing code uses the white value to compute a new contrast so that the white value of upcoming images will be within the optimal range. Taking into account the linear properties of the gain and exposure settings, the new contrast can be computed from the contrast and the white value of the captured image by performing a simple linear scaling. The linear scaling is performed by computing an offset white value that is equal to the white value of the image minus the black level. The black level is the pixel value that will be returned by the imager when the image has no exposure at all. Additionally, an offset target is computed which is the target white value defined as the optimal white value minus the black level. In this regard, the new target contrast for upcoming images is equal to the contrast of the current image times the offset target white value divided by the offset white value of the image (contrast of current image×offset target white value/ offset white value of the current image=new target contrast).

In the case of an over-exposed image it is not possible to perform a linear scaling to determine the new target white value because it is not possible to accurately determine the white value of the current image due to saturation at the imager's digitizer. In this instance, a determination is made that the image is over-exposed if 6.25% of the pixels are greater than a maximum value and if there are any pixels that have maximum exposure. The number of maximum exposed pixels is used as the argument to an empirically derived function that determines how much the contrast needs to be adjusted in order to obtain an image with a white value of 255.

After the amount of contrast adjustment required to produce an image with a white value of 255 is determined then the contrast is computed using the linear scaling previously described herein, thereby adjusting the maximum white value down to the target white value and the result of this adjustment is a new target contrast that, at 590, is communicated to the imager control module.

After the histogram processing module has determined that it has captured an image whose white value falls within the optimal white value range for pattern recognition and/or decoding, it notifies the pattern recognition and decoder module that a valid image has been captured. At this point, the pattern recognition and decoder module can retrieve the image from RAM and perform its processing on the image.

This dual module scheme allows for the exposure to be written to the imager during specific intervals of time in the imager's frame period. A real-time response can be realized to keep up with the imager's state and to respond to any frame signals from the imager. The imager control module that controls the camera is implemented in an interrupt service routine or another high priority routine or real-time thread. The histogram processing module that does the computations on the image to determine what exposure and gain settings should be used are implemented in a task. This routine permits the module that does the intensive CPU computations to exist at the task level while the module that controls the imager and desires real-time response exists in an interrupt service routine where it can meet stringent timing criteria. The overall result is that exposure can be modified on the fly to affect real-time exposure settings that reflect the actual image being captured.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An imaging device for capturing optical image data, the device comprising:
    an imager for generating an image signal;
    a memory component that receives the image signal from the imager and stores the image signal as image data;
    a processor operating according to a multi-tasking operating system;
    a histogram processing module executed by the multi-tasking operating system as a low priority task that analyzes the image data in the memory component and calculates a target contrast; and
    an imager control module executed by the multi-tasking operating system concurrently with the histogram processing module, the imager control module being executed as a high priority task that sets a gain and exposure for the imager based on the target contrast calculated by the histogram processing module.

2. The imaging device of claim 1, wherein the imager generates the image signal from multi-dimensional symbologies.

3. The imaging device of claim 1, wherein the multi-tasking operating system is a real-time operating system and wherein the imager control module is executed as a real-time thread.

4. The imaging device of claim 1, wherein the imager control module is implemented in a high priority thread.

5. The imaging device of claim 1, wherein the imager control module is implemented in an interrupt service routine.

6. The imaging device of claim 1, wherein the histogram processing module is implemented in a low priority thread routine.

7. The imaging device of claim 1, further comprising a Direct Memory Access (DMA) controller that receives the image signals from the imager, responds to an image capture command from the histogram processing module and transfers captured image signals into the memory component.

8. The imaging device of claim 1, further comprising a programmable logic device that serves as an interface between the imager and the processor.

9. The imaging device of claim 8, wherein the programmable logic device comprises a DMA controller that receives the image signals from the imager, responds to an image capture command from the histogram processing module and transfers captured image signals into the memory.

10. An imaging device for capturing optical image data, the device comprising:
    an imager for generating an image signal;
    a memory component that receives the image signal from the imager and stores the image signal as image data; and
    a processor operating pursuant to a multi-tasking operating system that concurrently executes a high priority software-exclusive module for real time control of the imager with a lower priority software-exclusive module that examines the image data and provides feedback to the high priority software-exclusive module facilitating setting of a gain and exposure of the imager.

11. A method for exposure control in a multi-dimensional imaging device, the method comprising:
    executing, as a high priority task in a multi-tasking operating system, a first software-exclusive module that controls exposure and gain settings in the imager in response to an end of frame signal:
    generating, in the first software-exclusive module, a captured contrast setting, wherein contrast is defined as the product of the exposure setting and the gain setting;
    executing, concurrently with the the first software-exclusive module, a second software-exclusive module that calculates a target contrast setting in response to the end of frame signal, the captured contrast setting and stored image data, the second software-exclusive module being executed as a low priority task;
    generating, in the first software-exclusive module, a subsequent exposure and gain setting for the imager in response to the target contrast setting; and
    implementing the subsequent exposure and gain setting in the imager.

12. A program storage device readable by a processor, tangibly embodying a program of instructions executable by the processor to perform a method for exposure control in a multi-dimensional imaging, the method comprising:
    generating, in a high priority software-exclusive module, a captured contrast setting in response to an end of frame signal from an imager, wherein contrast is defined as the product of exposure setting and gain selling;
    calculating, in a low priority software-exclusive module concurrently executed with the high priority software-exclusive module, a target contrast setting in response to the end of frame signal from the imager, the captured contrast setting and stored image data;
    generating, in the high priority software-exclusive module, a subsequent exposure and gain setting for the imager in response to the target contrast setting; and
    implementing the subsequent exposure and gain setting in an imager of the multi-dimensional imaging device.

13. The program storage device of claim 12, wherein generating, in a high priority software-exclusive module, a captured contrast setting in response to an end of frame signal from an imager and generating, in the high priority software-exclusive module, a subsequent exposure and gain setting for the imager in response to the target contrast setting further comprises generating in an interrupt service routine module.

14. The program storage device of claim 12, wherein generating, in a high priority software-exclusive module, a captured contrast setting in response to an end of frame signal from an imager and generating, in the high priority software-exclusive module, a subsequent exposure and gain setting for the imager in response to the target contrast setting further comprises generating in a high priority thread module.

15. The program storage device of claim 12, wherein generating, in a high priority software-exclusive module, a captured contrast setting in response to an end of frame signal from an imager and generating, in the high priority software-exclusive module, a subsequent exposure and gain setting for the imager in response to the target contrast setting further comprises generating in a high priority task module.

16. The program storage device of claim 12, wherein calculating, in a low priority software-exclusive module, a target contrast setting in response to the end of frame image signal from the imager, the captured contrast setting and stored image data further comprises calculating in a low priority task module.

17. The program storage device of claim 12, wherein calculating, in a low priority software-exclusive module, a target contrast setting in response to the end of frame image signal from the imager, the captured contrast setting and stored image data further comprises calculating in a low priority thread module.

18. The program storage device of claim 12, wherein calculating, in a low priority software-exclusive module, a target contrast setting in response to the end of frame image signal from the imager, the captured contrast setting and stored image data further comprises implementing histogram processing to calculate a target contrast setting.

19. A portable bar code reader for capturing optical image data, the portable bar code reader comprising:
   an imager for generating an image signal based on a bar code;
   a memory component that receives the image signal from the imager and stores the image signal as image data; and
   a central processing unit operating in accordance with a multi-tasking operating system and a plurality of concurrently executed software based imaging modules to calculate and adjust settings of the imager based on an analysis of the image signals stored in the memory component wherein modules that adjust setting of the imager are given a higher priority than modules that calculate desired settings of the imager.

20. The bar code reader of claim 19, wherein the software based imaging modules comprise a first software-exclusive module that controls the exposure and gain setting in the imager and a second software-exclusive module that implements computations in response to exposure data transmitted from the first software-exclusive module to determine a targeted exposure and gain setting.

21. The bar code reader of claim 20, wherein the second software-exclusive module implements computations in response to exposure data transmitted from the first software-exclusive module and image data transmitted from the memory component.

22. The bar code reader of claim 20, wherein the first software-exclusive module is implemented in a high priority thread.

23. The bar code reader of claim 20, wherein the first software-exclusive module is implemented in a high priority task.

24. The bar code reader of claim 20, wherein the first software-exclusive module is implemented in an interrupt service routine.

25. The bar code reader of claim 20, wherein the second software-exclusive module is implemented in a low priority thread routine.

26. The bar code reader of claim 20, wherein the second software-exclusive module is implemented in a low priority task routine.

27. The bar code reader of claim 20, wherein the second software-exclusive module includes histogram processing.

28. The bar code reader of claim 20, wherein the first software-exclusive module is implemented in a an interrupt service routine and the second software-exclusive module is implemented in a low priority task routine.

29. A barcode imaging device for capturing information, the device comprising:
   an optics imaging system that captures an image of a two-dimensional barcode data symbol;
   an imaging sensor in communication with the optics imaging system that receives the image from the optics imaging system and converts the image to an electrical signal representative of image data;
   a memory storage element in communication with the sensor that stores the image data; and
   a central processing unit (CPU) in communication with the imaging system, the imaging sensor and the storage element, wherein the CPU implements a multitasking operating system that concurrently executes a first high priority software-exclusive module that provides imaging system control processing and a second low priority software-exclusive module that recognizes and decodes the image data.

30. The device of claim 29, wherein the multi-tasking operating system implemented by the CPU of the barcode imaging device further executes a third software-exclusive module that performs calculations on the image data.

31. The device of claim 29, wherein the first software-exclusive module is further defined as controlling imager exposure time.

32. The device of claim 29, wherein the first software-exclusive module is further defined as synchronized with timing of the imager.

33. The device of claim 29, wherein the barcode imaging device is further defined as a portable barcode imaging device.

* * * * *